United States Patent
Williamson

(10) Patent No.: US 9,032,283 B2
(45) Date of Patent: May 12, 2015

(54) RENDERING COMMON CELL FORMATTING FOR ADJACENT CELLS

(75) Inventor: Tsurishaddai Williamson, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 1289 days.

(21) Appl. No.: 12/286,320

(22) Filed: Sep. 29, 2008

(65) Prior Publication Data

US 2010/0083087 A1 Apr. 1, 2010

(51) Int. Cl.
*G06F 17/00* (2006.01)
*G06F 17/24* (2006.01)

(52) U.S. Cl.
CPC .................. *G06F 17/246* (2013.01)

(58) Field of Classification Search
CPC ....................................... H04N 1/00
USPC ......................... 715/217, 212, 200
See application file for complete search history.

(56) References Cited

U.S. PATENT DOCUMENTS

| | | | | |
|---|---|---|---|---|
| 5,222,207 | A * | 6/1993 | Yamada | 345/442 |
| 5,231,577 | A * | 7/1993 | Koss | 715/210 |
| 5,638,503 | A * | 6/1997 | Hoel | 345/442 |
| 6,518,981 | B2 * | 2/2003 | Zhao et al. | 715/764 |
| 6,640,234 | B1 * | 10/2003 | Coffen et al. | 715/219 |
| 6,968,255 | B1 * | 11/2005 | Dimaridis et al. | 700/131 |
| 7,627,812 | B2 * | 12/2009 | Chamberlain et al. | 715/217 |
| 7,849,395 | B2 * | 12/2010 | Ellis et al. | 715/212 |
| 2004/0060001 | A1 * | 3/2004 | Coffen et al. | 715/503 |
| 2007/0033519 | A1 * | 2/2007 | Zdenek | 715/503 |
| 2008/0033777 | A1 * | 2/2008 | Shukoor | 705/8 |
| 2013/0191715 | A1 * | 7/2013 | Raskovic et al. | 715/227 |

* cited by examiner

*Primary Examiner* — Manglesh M Patel
(74) *Attorney, Agent, or Firm* — Fletcher Yoder PC

(57) ABSTRACT

Rendering common cell formatting for adjacent cells is disclosed. In some embodiments, when rendering cells, a set of adjacent cells that have at least one type of cell formatting in common is identified, and the at least one type of cell formatting is rendered as a single entity rather than individually for each cell in the set to prevent visual artifacts between adjacent cells from arising.

17 Claims, 4 Drawing Sheets

200

300 ⭨

| | |
|---|---|
| diagonal fill pattern | (A1:A5, B1, C1, D1) |
| grid fill pattern | (D4:D5) |

FIG. 3

RENDERING COMMON CELL FORMATTING FOR ADJACENT CELLS

BACKGROUND OF THE INVENTION

Typically, when rendering cells, the content and formatting associated with each cell is rendered individually. In some cases, this results in visual artifacts, such as seams, at the borders of contiguous cells that have common formatting. FIG. 1 illustrates an example of the manner in which contiguous cells having a common fill pattern are rendered. As depicted, seams in the fill pattern are visible between borders 102 of adjacent cells even though they all have the same fill pattern.

BRIEF DESCRIPTION OF THE DRAWINGS

Various embodiments of the invention are disclosed in the following detailed description and the accompanying drawings.

FIG. 3 illustrates an embodiment of a data structure of a dictionary for sets of adjacent cells with common formatting.

DETAILED DESCRIPTION

Figure 1:
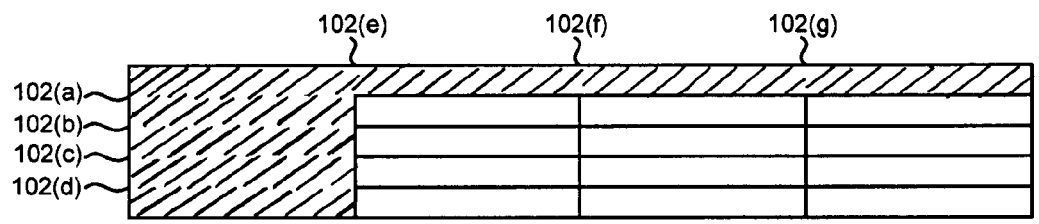
FIG. 1 illustrates a prior art example of the manner in which contiguous cells having a common fill pattern are rendered.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rendering common cell formatting for adjacent cells is disclosed. In some embodiments, the term "cell" refers to a cell of a table in an application, such as a word processing application, presentation application, spreadsheet application, desktop publishing application, web site design application, etc. In some embodiments, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. In some embodiments of spreadsheet applications, cells are organized into one or more individual tables or table objects, each of which includes a desired number of rows and columns of cells. In such cases, a sheet of a spreadsheet document may include a desired number of table objects as well as other objects such as charts, graphs, images, etc. In other embodiments of spreadsheet applications, cells may be organized into other configurations, such as the (seemingly) infinite single grid or table of cells in each sheet of some typical spreadsheet applications that includes an unlimited (or very large) number of rows and columns of cells.

Figure 2:
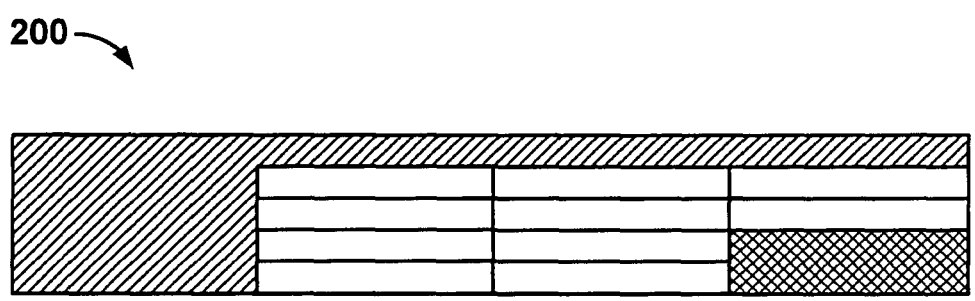
FIG. 2 illustrates an embodiment of a table that includes two sets of adjacent cells having a common fill pattern.

Rendering common cell formatting associated with a set of adjacent cells as a single entity is disclosed herein. The term "set of adjacent cells" as used herein refers to a set of cells in which each cell in the set shares at least one edge and/or corner with another cell in the set. Rendering common cell formatting as a single entity instead of individually for each cell results in the visual fidelity of the common cell formatting to be preserved, e.g., when printing, by preventing seams or other visible artifacts along borders or edges of adjacent cells from appearing. The described techniques may be employed when rendering any type of common cell formatting for a set of adjacent cells, such as cell border formatting (including, e.g., line color, transparency, pattern, weight, etc.), cell background formatting (including, e.g., cell fill color, transparency, pattern, pattern color, etc.), etc. FIG. 2 illustrates an embodiment of a table 200 that includes two sets of adjacent cells having a common fill pattern: the set comprising the cells in the first row and first column of table 200 and the set comprising the cells in the last two rows of the rightmost column of table 200. At the time of printing, the fill pattern of each set is, in some embodiments, rendered as a single entity so that seams do not appear in the common formatting associated with each set.

In some embodiments, one or more sets of adjacent cells that each have at least one type of formatting in common are identified, e.g., prior to rendering or printing. In some embodiments, a dictionary or other data structure keyed by cell formatting type is created for sets of cells. In some such cases, a cell formatting type for a particular set of adjacent cells is united into a single Bezier path so that it can be rendered as a single entity. For example, a Bezier path may be employed to define a shape that represents and/or circumscribes the union of the individual cells in the set of cells and to which the common formatting can be applied once. FIG. 3 illustrates an embodiment of a data structure of a dictionary 300 for the cells comprising table 200 of FIG. 2. In the given example, dictionary 300 is keyed by fill pattern type (i.e., diagonal fill pattern, grid fill pattern), and the cells comprising a particular set are enclosed by parentheses. In some embodiments, a set of adjacent cells may have a plurality of types of formatting in common (e.g., the set of cells may have the same fill pattern and fill color), and the described techniques may be similarly employed to render at least a subset of the plurality of types of cell formatting as a single entity to prevent visual artifacts from arising. In such cases, a key of an associated dictionary may represent a plurality of types of cell formatting. Alternatively, even though a set of adjacent cells may share a plurality of types of formatting in common, each type of common formatting may be rendered separately, and each key of an associated dictionary may correspond to a single formatting type.

Figure 4:
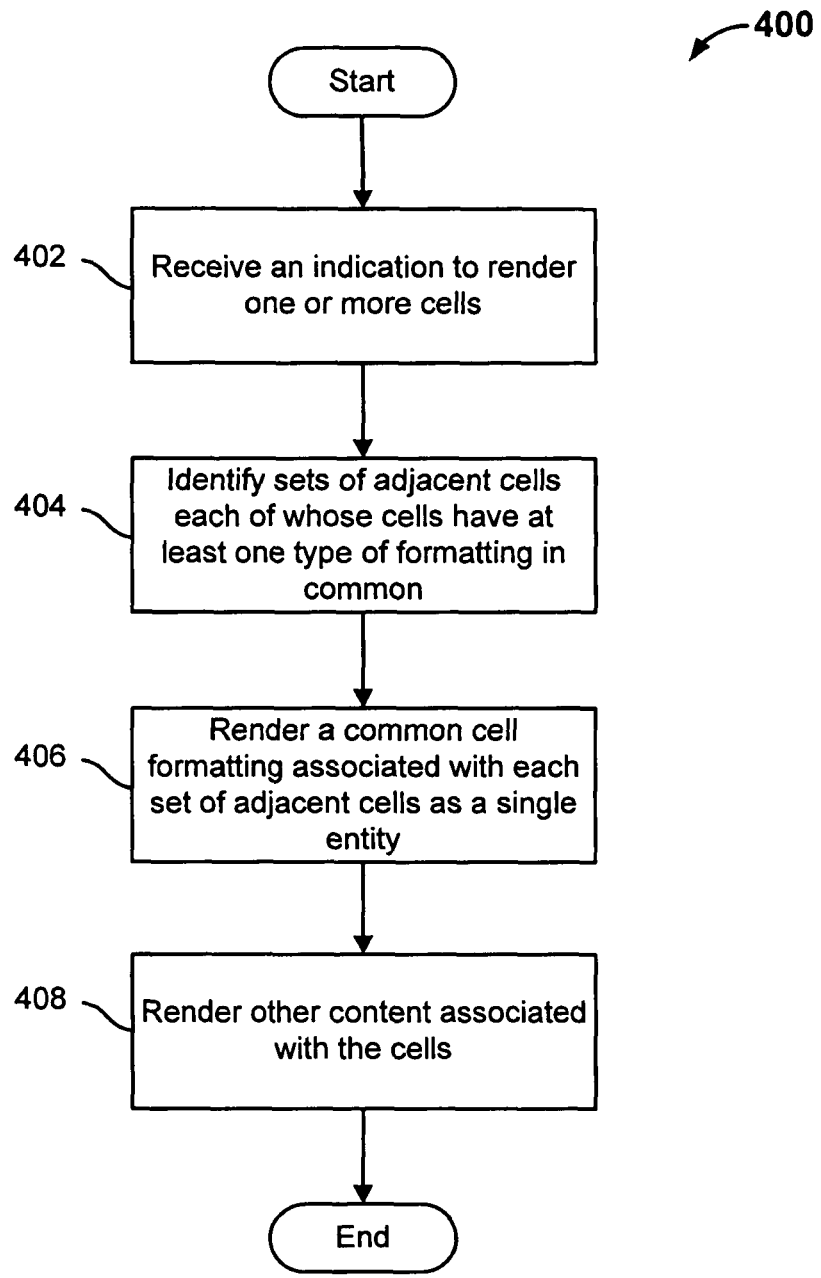
FIG. 4 illustrates an embodiment of a process for rendering cells.

FIG. 4 illustrates an embodiment of a process 400 for rendering cells. For example, process 400 may be employed when printing cells. In some embodiments, process 400 is employed to render table 200 of FIG. 2. At 402, an indication to render one or more cells is received. In some embodiments, the indication is received in response to a selection of an option to print the one or more cells. The one or more cells may be associated with, for example, a table and/or a spreadsheet. At 404, sets of adjacent cells each of whose cells have at least one type of formatting in common are identified, if any such sets exist in the one or more cells. In some embodiments, 404 includes generating a dictionary keyed by common cell formatting types associated with the sets of adjacent cells. In some embodiments, for each set of adjacent cells whose cells have at least one type of formatting in common, a common cell formatting type for the set is united into a single Bezier path. Consider, for example, a twenty cell by forty cell table in a spreadsheet that includes a three cell by three cell area in which each cell has a fill color of blue. In this example, for instance, the three cell by three cell area would be identified at 404 and associated with a fill color of blue. At 406, a common cell formatting associated with each set of adjacent cells identified at 404 is rendered as a single entity rather than individually for each cell in the set. For example, in the foregoing example, the three cell by three cell area having blue fill is rendered as a single shape with blue fill, underlying the nine cells in the set, rather than nine separate areas, one for each cell in the set, and each having blue fill. In another example, consider a three cell by three cell area that a user has enclosed with a border, for example by defining for each of the outer eight cells a partial border (e.g., both outer edges for corner cells and the single outer edge for outer cells not on a corner). In some embodiments, 404 and 406 would include recognizing the nine cells comprise an adjacent set of cells and that the border segments construct a continuous border around the set, which would be rendered by defining a nine cell by nine cell single area (e.g., a Bezier path that circumscribes the set) and rendering that single, large area as a rectangle with a continuous border around it. In various embodiments, the common cell formatting may include one or more cell formatting types. At 408, other content associated with the cells is rendered. For example, 408 may include rendering the value of each cell, rendering formatting that is unique to each cell and/or is possible to render individually for the cell without creating visual artifacts even though adjacent cells may have the same formatting, etc. In some embodiments, the other content associated with the cells is rendered individually for each cell at 408. Process 400 subsequently ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product for rendering cells, the computer program product being embodied in a non-transitory, tangible computer readable storage medium and comprising computer instructions for:

identifying a set of adjacent cells that have at least one type of cell formatting in common; and rendering the at least one type of cell formatting as a single entity for the set of cells, including by uniting the at least one type of cell formatting shared by the set of cells into a single Bezier path and rendering the cell formatting into the set of cells as if the set of cells were a single cell.

2. The computer program product recited in claim 1, wherein the at least one type of cell formatting comprises one or more of cell background formatting and cell border formatting.

3. The computer program product recited in claim 1, wherein rendering the at least one type of cell formatting as a single entity for the set of cells prevents visual artifacts between adjacent cells in the set from arising.

4. The computer program product recited in claim 1, wherein rendering the at least one type of cell formatting as a single entity comprises printing the at least one type of cell formatting as a single entity.

5. The computer program product recited in claim 1, further comprising computer instructions for generating a data structure keyed by one or more common cell formatting types including the at least one type of cell formatting shared by the set of cells.

6. The computer program product recited in claim 1, further comprising computer instructions for individually rendering for each cell in the set other content associated with that cell.

7. The computer program product recited in claim 1, further comprising computer instructions for individually printing for each cell in the set other content associated with that cell.

8. The computer program product recited in claim 1, wherein the at least one type of cell formatting comprises a plurality of types of cell formatting that the cells of the set have in common and wherein rendering the at least one type of cell formatting as a single entity comprises individually rendering each of at least a subset of types of cell formatting in the plurality as a single entity.

9. The computer program product recited in claim 1, wherein identifying the set of adjacent cells comprising identifying a plurality of sets of adjacent cells including the set wherein each set of adjacent cells of the plurality has at least one type of common cell formatting and further comprising computer instructions for rendering for each set in the plurality the at least one type of common cell formatting as a single entity.

10. A system for rendering cells, comprising:
    a processor configured to:
    identify a set of adjacent cells that have at least one type of cell formatting in common; and
    render the at least one type of cell formatting as a single entity for the set of cells, including by removing interior borders of the set of cells and rendering the cell formatting as if the set of cells were a single cell, wherein the formatting comprises a Bezier path that extends contiguously across the set of cells; and
    a memory coupled with the processor, wherein the memory is configured to provide the processor with instructions.

11. The system recited in claim 10, wherein the at least one type of cell formatting comprises one or more of cell background formatting and cell border formatting.

12. The system recited in claim 10, wherein to render the at least one type of cell formatting as a single entity comprises to print the at least one type of cell formatting as a single entity.

13. The system recited in claim 10, wherein rendering the at least one type of cell formatting as a single entity for the set of cells prevents visual artifacts between adjacent cells in the set from arising.

14. A method for rendering cells, comprising:
   identifying a set of adjacent cells that have at least one type of cell formatting in common wherein the cell formatting comprises a first pattern; and
   rendering the at least one type of cell formatting as a single entity for the set of cells, including by uniting the at least one type of cell formatting shared by the set of cells into a single Bezier path, thereby causing the first pattern to extend contiguously across the set of cells.

15. The method recited in claim 14, wherein the at least one type of cell formatting comprises one or more of cell background formatting and cell border formatting.

16. The method recited in claim 14, wherein rendering the at least one type of cell formatting as a single entity comprises printing the at least one type of cell formatting as a single entity.

17. The method recited in claim 14, wherein rendering the at least one type of cell formatting as a single entity for the set of cells prevents visual artifacts between adjacent cells in the set from arising.

\* \* \* \* \*